(12) United States Patent
Caswell

(10) Patent No.: US 12,293,359 B1
(45) Date of Patent: May 6, 2025

(54) DECENTRALIZED WIRELESS CLOUD SERVICES NETWORKS SYSTEMS AND METHODS

(71) Applicant: RevoFi LLC, Farmington, NM (US)

(72) Inventor: Justin Wayne Caswell, Farmington, NM (US)

(73) Assignee: RevoFi LLC, Farmington, NM (US)

( * ) Notice: Subject to any disclaimer, the term of this patent is extended or adjusted under 35 U.S.C. 154(b) by 376 days.

(21) Appl. No.: 17/878,626

(22) Filed: Aug. 1, 2022

Related U.S. Application Data

(60) Provisional application No. 63/228,079, filed on Jul. 31, 2021.

(51) Int. Cl.
G06Q 20/38 (2012.01)
H04W 84/18 (2009.01)

(52) U.S. Cl.
CPC ....... G06Q 20/389 (2013.01); *G06Q 2220/00* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 2019/0158594 | A1* | 5/2019 | Shadmon | ............... H04L 67/01 |
| 2019/0386969 | A1* | 12/2019 | Verzun | ................. G06F 21/606 |
| 2021/0217001 | A1* | 7/2021 | Harrison | ............. G06F 21/6218 |

OTHER PUBLICATIONS

Bellavista et al., "An Edge-based Distributed Ledger Architecture for Supporting Decentralized Incentives in Mobile Crowdsensing", May 1, 2020, IEEE, 2020 20th IEEE/ACM International Symposium on Cluster, Cloud and Internet Computing (CCGRID) (2020, pp. 781-787) (Year: 2020).*

* cited by examiner

*Primary Examiner* — Davoud A Zand
(74) *Attorney, Agent, or Firm* — Santangelo Law Offices, P.C.

(57) ABSTRACT

Embodiments of the application may provide a decentralized wireless cloud service system including a distributed ledger database, a consensus algorithm, an exchange wallet, a platform, a distributed cloud, software configured to integrate the exchange wallet, the platform, and even the distributed cloud into a distributed ledger database to create a decentralized wireless cloud system, resource nodes in a decentralized wireless cloud system configured to provide a resource on a decentralized wireless cloud system, wherein a resource may include a network resource from at least some of the resource nodes; and perhaps even a reward system to owners of said resource nodes for a resource.

23 Claims, 6 Drawing Sheets

DECENTRALIZED WIRELESS CLOUD SERVICES NETWORKS SYSTEMS AND METHODS

This is a U.S. Nonprovisional patent application claiming priority to and the benefit of U.S. Provisional patent application No. 63/228,079 filed Jul. 31, 2021, hereby incorporated by reference herein in its entirety.

BACKGROUND OF THE INVENTION

Data centers, cloud computing, and networks that comprise the Internet and World Wide Web can handle the storage, compute, routing, network administration, and web services on a global basis. As technology advances, cloud-based services with networking and various forms of storage and compute (e.g., GPU, DPU, or the like) and distributed ledger technologies using blockchain and various forms of consensus technologies for a multitude of purposes have become more common. For some users, it may be desirable to conduct data centers, cloud computing, and networks that allows for data storage, compute, routing, interpolation, or the like in a more secure and efficient manner than what current distributed ledger technologies, data centers, storage, compute, cloud, and network technologies using blockchain and other currently available technologies allow. Decentralized infrastructure is discussed in PCT Publication No. WO 2020/018589 A1 to Caswell, hereby incorporated by reference herein.

SUMMARY OF THE INVENTION

The present invention includes a variety of aspects, which may be selected in different combinations based upon the particular application or needs to be addressed. Currently in today's infrastructure for communications, computing, and data storage most physical resources to support these systems exist in data centers that centralize access and resources. These data centers may house the physical hardware, such as servers, network appliances, and various other hardware that then in turn house and run the workloads of applications used by end users and companies globally. Data centers can also provide internet connectivity to the physical hardware by providing ISP (Internet Service Provider) options to the tenants who house their physical hardware in the data center. All these combined can form the infrastructure that is globally recognized as "the cloud", "World Wide Web", and "the Internet". Embodiments of the application provide a way to move the physical hardware, cloud and cloud services, storage, compute, connectivity, and all associated technologies out of the data center and out to the edge and far edge. It may be the intersection of storage, compute, cloud, networks, distributed ledger technology, hardware, and associated technologies. Embodiments of the application can provide methods and systems to decentralize these technologies and combine them in a novel way.

Naturally, further objects, goals and embodiments of the inventions are disclosed throughout other areas of the specification, claims, and drawings.

DETAILED DESCRIPTION OF THE INVENTIONS

It should be understood that embodiments include a variety of aspects, which may be combined in different ways. The following descriptions are provided to list elements and describe some of the embodiments of the application. These elements are listed with initial embodiments; however, it should be understood that they may be combined in any manner and in any number to create additional embodiments. The variously described examples and preferred embodiments should not be construed to limit the embodiments of the application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the application to provide a platform, perhaps called a RevoFi platform which can integrate a blockchain such as a Revos blockchain which may include a native token for the system such as the Revos ("RVS"). A Revos blockchain could use any type of consensus algorithm (201), such as Major Vote Cellular Automata (MOCA) or others including a Swarm Sync Protocol and the like. A consensus algorithm may be a procedure through which all the peers of a blockchain network may reach a common agreement about the present state of a distributed ledger.

Figure 6:
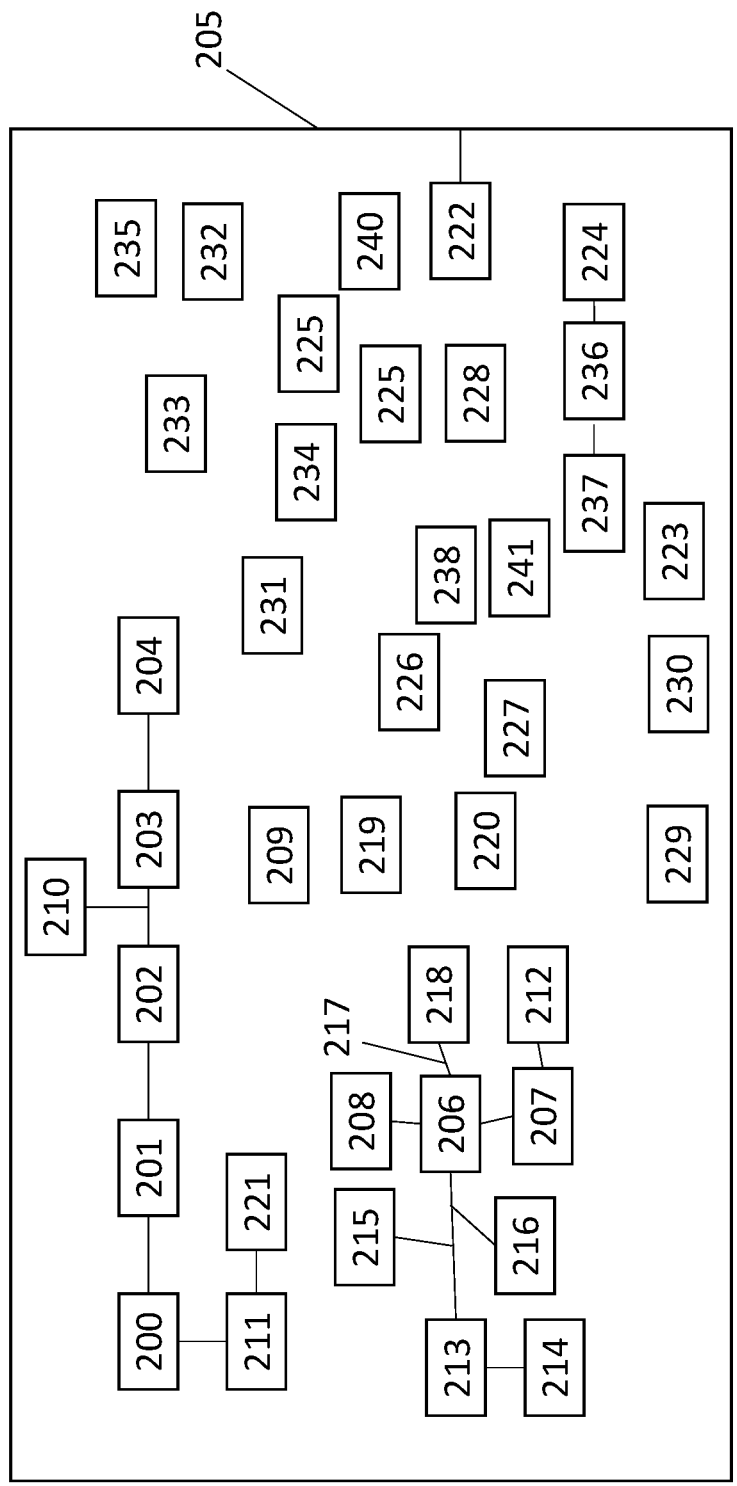
FIG. 6 shows a non-limiting example of a decentralized wireless cloud system in accordance with some embodiments of the application.

As may be understood in FIG. 6, embodiments of the application may include a method for providing decentralized wireless cloud services comprising the steps of providing a distributed ledger database (200); providing a consensus algorithm (201); providing an exchange wallet (202); providing a platform (203); providing a distributed cloud (204); integrating said exchange wallet, said platform, and said distributed cloud into said distributed ledger database to create a decentralized wireless cloud system (205); adding resource nodes (206) to said decentralized wireless cloud system; providing a resource (207) from said resource nodes on said decentralized wireless cloud system; wherein said resource comprises a network resource from at least some of said resource nodes; and perhaps even rewarding owners (208) of said resource nodes for said resource provided by said resource nodes on said decentralized wireless cloud system with tokens. Embodiments may include a decentralized wireless cloud service system comprising a distributed ledger database (200); a consensus algorithm (201); an exchange wallet (202); a platform (203); a distributed cloud (204); software (210) configured to integrate said exchange wallet, said platform, and said distributed cloud into said distributed ledger database to create a decentralized wireless cloud system (205); resource nodes (206) in said decentralized wireless cloud system configured to provide a resource (207) on said decentralized wireless cloud system; wherein said resource comprises a network resource from at least some of said resource nodes; and perhaps even a reward system (209) to owners of said resource nodes for said resource.

Figure 1:
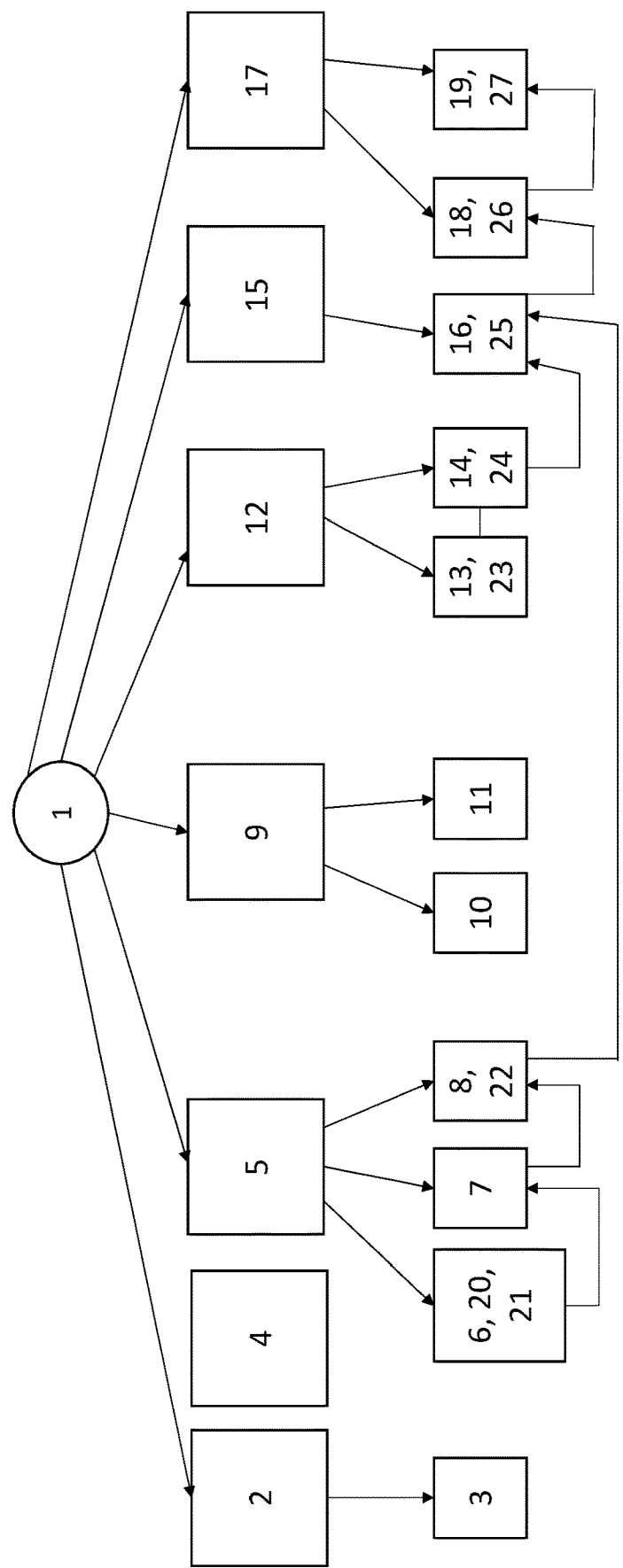
FIG. 1 shows a non-limiting example of an overview of aspects that may make up a decentralized wireless cloud services networks in accordance with some embodiments of the application.

As may be understood from FIG. 1, a decentralized wireless cloud system (1) may include a distributed ledger technology (2) such as a blockchain (211), an exchange and finance technology (5), a migration component (9), a platform (12), a miner management component (15), and perhaps even a distributed cloud (17), or the like. A distributed ledger technology (2) may integrate (3) a platform, wallet, and perhaps even a distributed cloud into a blockchain and may even have tokenomics. A web interface (4) may be provided on a private network and Android and IOS apps may be used. An exchange and finance technology (5) may provide token data credits (6) and even tokens (20) which can be exchanged for fiat (21) and/or swapped through a bi-lateral swapping method for other tokens. It may also provide data credit purchases and plans (21). An exchange and finance technology (5) may include a wallet (7) perhaps for exchange for fiat and/or swapped through a bi-lateral swapping method for other tokens. An exchange and finance technology (5) may include a library (8) and even apps (22) perhaps for native mobile and web apps. A migration component (9) may include customer architecture and solutions (10) and perhaps even tools (11) for migration and platform application programming interface ("API") requests.

A platform (12) may include hardware (23) and even kernel development (13). Kernel development may be computer program development that can be a core of an operating system perhaps with complete control over everything in the system. A platform may include API (14) and even web service ("WS") deployment and metrics (24), or the like. A miner management component (15) may integrate a miner owner wallet for setup (16) and may allow management of settings for a miner (25). A distributed cloud (17) may provide an explorer backend (18) that may collect information on the health of a system and may conduct actual deployment (26) of applications. A distributed cloud (17) may provide a management interface (19) and even microservices (27) perhaps to deploy web services to a decentralized wireless cloud system infrastructure.

A miner owner may be added to a decentralized wireless cloud system. A node may be provided by a miner owner. A node may be a device that can play a part in a larger network. A node may be one of the computers that run a blockchain's software perhaps to validate, store, or the like history of transactions on a network. A node can also refer to any system or physical equipment that is connected to a network and capable of performing specific duties such as creating, receiving, or sending data across a communication channel. A reward (209) may be tokens or any other kind of reward. A resource (207) may include but is not limited to wireless storage, wireless coverage, wireless computing, verifying a network, any combination thereof, and the like. A network resource may be a mobile network hotspot.

A blockchain may reward miners and can include various forms of blockchain based technologies such as Proof of Network, Proof of Ping, or the like. Embodiments may provide a resource validation (212) which may provide validation of a resource. This could include proof of network, proof of ping, or the like.

Proof of Network ("PoN") could be used for various reward types such as wireless coverage, storage, compute, and other resources that may be on and/or available on the network. This can be done by validating a specific resource of a node by issuing a challenge (215) to the node by anyone, a challenge node (213) in a randomly selected swarm of nodes (214). The node that may be challenged will need to provide proof (216) of that specific resource and how much utilization it has as an example. If a node can prove that it in fact has the resource and its utilization, such as a resource utilization, to the swarm and challenging node, then a reward may be given to that specific node as a mining reward.

Proof of Ping ("PoP") may be used for a reward type perhaps based on hops, response times, or the like. Ping may be a known and highly used UNIX tool to "ping" an IP address or other similar uses. A ping command may send a request packet to network hosts or the like and can report on the response from the remote server outputting to standard output. This can be used to check if a remote host is up or perhaps if a network interface can be reached. A hop may be the trip a data packet can take from one router or intermediate point to another in a network. On a network that uses transmission control protocol or even internet protocol, the number of hops a packet has taken toward its destination can be kept in a packet header. A challenging node (213) can issue a PoP challenge (215) and the randomized swarm of nodes (214) can witness the challenge. The challengee node may respond with a ping or even multiple pings back to the challenging node. The swarm can witness the response ping(s) along with the challenging node. The reward can be granted for a successful ping challenge and response to both nodes.

Embodiments of the application may provide mining and token rewards. While there may not be an exact formula for calculating how many tokens such as RVS that one can earn over a given period, there may be some higher level concepts, design elements, and rules to evaluate that can help explain what one can earn and why. This discussion covers these, as well as mining and token reward details.

Embodiments of the application may allow hotspots and other hardware devices to earn tokens, such as a Revos Token. A distributed ledger database such as a blockchain can reward hotspots perhaps for providing wireless coverage, storage, compute, and even verifying a network. A hotspot may be a node. As discussed herein Proof of Network ("PoN") can be used for some or all of a reward for mining tokens perhaps to validate utilization of network resources. Proof of Ping (PoP) may be used for some or all of a reward for mining tokens perhaps to validate. An owner, such as miner owner, may provide a commodity (220) which may include but is not limited to a proof of ping challenger, a proof of ping challenger, a proof of ping challengee, a security token owner, a proof of network wi-fi utilization provider, a proof of network computer utilization provider, a proof of network storage utilization provider, any combination thereof, and the like. Each owner may provide different commodities. Hotspots may perform various types of work and can be awarded such as provided in the non-limiting example of Table 1.

TABLE 1

| Reward Type | Description |
| --- | --- |
| PoP Challenger | An award may be provided to any device, node, miner owner that may create a valid PoN challenge. An entire network or even a randomly selected part of the network may know of the challenge, and the award to the challenging node may be given regardless if the challengee responds, perhaps in so long as the swarm validates the challenge. |
| PoP Challengees | Challenged nodes may have to pass this challenge if they are to participate in the network by the participating swarm. They may or may not receive tokens for passing, but it may be that they must pass to show they are providing functionality into a healthy network. |
| Periodic Mutual Authorization Challenger | Nodes, perhaps directly connected (217) nodes (206, 218), may periodically and even mutually authenticate each other perhaps by spending data credits on each other's nodes to send anonymous data. |
| Periodic Mutual Authorization Challengee | Directly connected nodes will periodically receive mutual authentication challenges (215). The challenged node may not know that it is being challenged by its peer when the challenging peer sends data through its peer to test if the node actively works, |
| Security | Can be awarded to the corporate treasury and even investors who contributed to financing the network and who may hold security tokens (219) such as Revos Security Tokens. |
| PoN Wi-Fi 6 Utilization | Wi-Fi 6 may be the amount of data transfer from connecting users of the Wi-Fi 6 network. |
| PoN Compute Utilization | Compute can refer to the CPU, RAM and even GPU used for servicing application developer web services. |
| PON Storage Utilization | Storage utilization may include how much disk the application developer may use for their decentralized application deployments. |

A node, hotspot, or the like may not have to actively participate to earn rewards. In embodiments, once a hotspot may be completely deployed and even fully synced with a distributed ledger database such as a Revos blockchain, the owner may not be required to do anything else in order to earn tokens such as $RVS. A hotspot can perform any and even all of the above activities on its own while it runs.

Embodiments of the application may provide a target $RVS production. A total produced RVS may be $2/\wedge(40 \text{ years})$ for a total of about 1,099,511,627,776 RVS over a 40 year period. This may mean that, if the blockchain performs as designed, it can produce $2/\wedge 39$ in the first year and halve every year after. Of course, the production may be any value over any time period and all are included in this application.

Blocks (221) may be formed based on or even utilizing commodities (220) and perhaps even on the number of transactions and may include compact blocks. Since challenges which complete or even initiated may count as transactions, this can enter into the ledger so blocks can eventually form on idle utilization. Block sizes can vary based on on-chain global variables that can set it from about $2/\wedge 12$ or more transactions. Each year there may be a halving, so early adopters who come in soon can benefit greatly through mining the majority of the tokens rewarding early adopters. Miners may be awarded at each block.

Embodiments of the application may provide token distributions such as allocations per block. As a non-limiting example, a block may be rewarded about 30,303 tokens such as RVS. A reward may be split between participants such as but not limited to the non-limiting examples as provided in Table 2. Of course, these values may be changed.

TABLE 2

| Reward Type | Percentage | Tokens (RVS) Earned by Reward Type |
| --- | --- | --- |
| PoP Challenger | 2.5% | 757.5 |
| PoP Challengees | 2.5% | 757.5 |
| Corporate Treasury & Revos Security Token Investors | 30% | 9,090 |
| PoN Wi-Fi 6 Utilization | 21.45% | 6,500 (The more it may be encouraged for node utilization, perhaps the more optimal the infrastructure can be) |
| PoN Compute Utilization | 21.45% | 6,500 |
| PoN Storage Utilization | 21.45% | 6,500 |
| Total | 100% | 30,303.03 |

Embodiments of the application may provide node utilization such as with Wi-Fi 6, compute, storage, or the like. Utilization may be the act of burning data credits to move data through a network perhaps on a Wi-Fi hotspot, provide service as a resource lease for computing, providing a network, and even providing storage for deploying a web service. When distributing tokens earned per block, the network may evaluate individually or in any combination: "What is the distribution of data credits burned per node?", "Were the burned credits valid?", "Did the account have enough data credits to actually spend?", "Did both the miner and client sign off on the data credit spend?", and perhaps even "Do all the transactions add up on the data credit balance per client?", or the like. As such, embodiments of the application may provide a reward allocation when a system may distribute tokens per block.

Once the number of valid data credits burned per node may be added, the tokens may be distributed for that block on all the transactions according to the distribution. As a non-limiting example, if 30,303 tokens may be awarded during mining and a chain variable may have about 21.45% of that perhaps going towards Wi-Fi 6 Utilization which may be about 6500 RVS in total, it could be useful to evaluate the distribution of data credit burns.

An non-limiting example, if an entire population of Nodes includes 10 nodes such as in the set {00, 01, 02, 03, 04, 05, 06, 07, 08, 09} and perhaps the total number of data credits burned on Wi-Fi 6 is 100,000 data credits with the following distribution:

| 1  | {            |
|----|--------------|
| 2  | 00: 100,     |
| 3  | 01: 1,000,   |
| 4  | 02: 50,000,  |
| 5  | 03: 0,       |
| 6  | 04: 7,500,   |
| 7  | 05: 0,       |
| 8  | 06: 0,       |
| 9  | 07: 0,       |
| 10 | 08: 20,000,  |
| 11 | 09: 39,400   |
| 12 | }            |

A key of the json may be the node label and the right side may be the number of data credits distributed. Tokens may be distributed to the nodes as follows:

| 14 | {          |
|----|------------|
| 15 | 00: 6.5,   |
| 16 | 01: 65,    |
| 17 | 02: 3250,  |
| 18 | 03: 0,     |
| 19 | 04: 487.5, |
| 20 | 05: 0,     |
| 21 | 06: 0,     |
| 22 | 07: 0,     |
| 23 | 08: 1300,  |
| 24 | 09: 2561   |
| 25 | }          |

A distribution may be exactly as is for distribution of work done on the network. Network utilization may be an important aspect of embodiments of the application and it may be desirable to emphasize the importance of serving the end user and application developers. In some embodiments, a majority of the rewards may be on utilization which can measure usefulness for system customers.

In embodiments, a device (222) may be capable of connecting to a decentralized wireless cloud system and may even utilize a flee management software architecture (223). A user (240) may obtain access to a decentralized wireless cloud system either through a device (222) or even via an application (224) which can be downloaded to a device, computer, smart device, or the like. A factory certificate security check (225) may be included on a device and may provide way to checking the factory certificate on a device. An authentication information input (236) may be provided via an application for a user to provide authentication information.

Embodiments of the application may include a statement of work for fleet management. A first layer may include fleet provisioning from the embedded device view. Phase 0 may include: when the device may be first built at the factory, there may be a server on in the factory that can plug into the embedded device perhaps via ethernet port. The server may be a pxe server and it could install the following individually or in any combination: (1) Root.crt for provisioning and other_revofi_root.crt necessary for the device; (2) Uniquely generated certificate that can identify the device. There may be a x509 pem cert perhaps signed by the factory second-intermediate private cert. This may enable mutual tls; (3) Provisioner and cronjob scripts perhaps to run the provisioning process when the device is plugged in.

Phase 1 may include individually or in any combination: (1) The embedded device may have a certificate installed from root.crt perhaps as well as its own certificate signed by root which can be used for mutual tls. This can be done at the factory; (2) The embedded device may have a cronjob that can check for updates at random time intervals such as at roughly 1 hour intervals, which can distribute workloads over time to cut down on traffic spikes. The cron job can run a script that does the following: (1) Query update registry for latest semver perhaps based on its own tag name. A tag name may contain the sku of the device, which can be used for filtering what devices receive updates; (2) If the query semver is different, then the script may get the with mutual tls to download the new provisioner scripts; (3) The tarred provisioner scripts may then be untarred and the provisioner may run the provisioning scripts to configure the system; (4) The script may then logs either success or error to the revofi telemetry server; (5) If the errors are significant, then the device can rollback to the original provisioned scripts and perhaps report its status to the telemetry server again; and perhaps even (6) If no errors were found, the device may report that it was successful to the revofi telemetry server.

Embodiments of the application may include a Phase 2 for reaching out for an update. A final architecture of fleet management may include the following individually or in any combination: (1) A central artifact registry that can hold a tar of provisioning files; (2) To access this articat registry, server pool may be provided behind a provisioning domain; (3) Each provisioning domain may have an Nginx load balancer in front of it perhaps with a unique second-intermediate certificate installed on it and may be signed by one of the revofi self signed roots; (4) Revofi roots may be kept safe on an air gap server perhaps protected via aes256-gcm passphrase. The root certs may create first-intermediate certificates, which may ultimately be responsible for creating all revofi, second-intermediate certificates that are deployed to all revofi infrastructure and services.

A domain may be set up perhaps called provision.revofi.com which may be the DNS load balancer that redirects traffic to domain pools, such as domainXYZ.provision.revofi.com domain pools that can contain the registries of our provisioning files. Non-limiting examples are provided below:

[provision.revofi.com]—Nginx DNS load balancer configuration example

```
http {
    resolver 10.0.0.1 valid=300s ipv6=off;
    resolver_timeout 10 s;
    server {
        location/{
            proxy_pass http://backend;
        }
    }
    upstream backend {
        zone backend 32 k;
        least_conn;
        #. . .
        server domain001.provision.revofi.com resolve;
        server domain001.provision.revofi.com resolve;
    }
}
```

[domain001.provision.revofi.com]—May have a Nginx SSL load balancer in front of the registry cluster. This server can conduct mutual tls authentication and may prevent access to provisioning files to devices that may not have a certificate signed by our factory certificate which its root belongs to the same root that Nginx SSL provisioner contains.

[domain001.provision.revofi.com][Nginx SSL LB—SSL Termination Point]E Registry clusters. A registry cluster can be normal nginx file servers that can return the latest provisional files. The access request from the nginx file served may be logged to our telemetry server. Also all attempts to access the SSL Termination point may be also logged into telemetry and we can generate reports.

[Network—DNS Load Balancer: provision.revofi. com]—Behind an Nginx SSL file server. A Nginx SSL load balancer can act as the SSL termination point and load balancer for the files. Each Nginx termination point may form a domain that contains one intermediate certificate we use.

A clr server perhaps at clr.revofi.com may be used and may be periodically updated when we have certificates that are compromised or even when we need to switch out certs. Intermediate certs may be installed perhaps where a root self signed cert may be stored on an air gapped server. The root may sign all the intermediate certificates.

In embodiments a second layer may be provided such as for fleet provisioning from the CICD image baking view. A repository such as a gitlab.io repository may hold all of the provisioning tar files. A CT/CD process may have a semver on each merge request that increments or can be set by the engineer. When a mr may be submitted and the regression tests run/pass, the code may then be committed with metadata that can filter for the proper embedded devices to be provisioned and their versions.

All servers in the registry can poll for these changes at some interval perhaps to sync its repository with the gitlab server. Once synced, then the registry can function as required.

Embodiments of the application may include adding labels to all of the devices perhaps based on SKU numbers and domain such as testnet, alpha, production, or the like. When these devices may go through provisioning they could report their status to a telemetry service.

A threshold of failures may be allowed and even displayed in our metrics dashboard and may provide an alert to an admin or team of what version failed and perhaps what the error logs were. There could be a way to rollback the updates.

A third layer may be provided such as fleet provisioning for platform provisioning. This may be a last step in a process perhaps if currently waiting on a backport for a kernel driver. It may be desirable to automate the building of our linux kernel perhaps with the backport of the custom MT7915 kernel driver or other driver and the like. The initial provisioning can install this particular linux kernel with the driver.

Other services that may need to be installed and configured can be hostapd, which may be responsible for hosting a Wi-Fi 6 access point. A Wi-Fi mesh (226) may be configured that can enable a decentralized wireless cloud system to network resources and even to connect to other RevoFi nodes. All RevoFi nodes may contain the same WPA supplicant and authenticates/authorizes all RevoFi nodes that have their certs signed by the factory certs. EAP-TLS may be used to authenticate into the network.

Freeradius may be configured and installed on the devices which can provide the backend of hostapd AAA server. It may not need to be tied into the blockchain at this point. A freeradius AAA server may be included on AWS perhaps where all certs signed by our factory are authenticated with unlimited data.

In some embodiments, a third layer may be provided such as MicroK8's or K3's Management. A MicroK8's or K3's may be configured on a Jetson Nano. On microk8's install or K3's, microk8's or K3's can download a RevoFi helm chart perhaps for both the RevoFi blockchain and RevoFi device management app. Both of these containers may be 1 node deploys scheduled the same core and ram. We can use mutual TLS for everything we do, so we can make sure we pull the correct images down.

A RevoFi blockchain application may need to speak with Radius, hostapd daemon, Wi-Fi driver for Wi-Fi control, as well as the device management application, or the like. Services may be exposed through a service mesh.

Phase 1 MVP may include running single node clusters that can run the application. We may not include the ability for vendors (227) to commandeer and lease resources/run applications on this infrastructure. We may only need to enable users to access the internet through our devices.

It may be desirable to figure a way to configure/run RevoFi containers from a dashboard or through other means. It may also be desirable to figure out how to report K8 or K3 logs to a central telemetry service on AWS or private cloud or the like. There can be health checks developed to insure RevoFi containers are up and running which report to a telemetry service. It may also be desirable to stand up a dashboard to show what devices statuses are running. Rollback as well as rolling updates may be configured on all microk8 or K3 devices.

Phase 2 may include enabling vendors to use data credits to perhaps lease resources and deploy 1 node clusters. We can then embark on designing minimal network and ingress/egress controllers perhaps to expose their web services to the world. Kube control planes/api's and masters may all be all 1 node.

Phase 3 may include implementing processes to add nodes so that customers can have multi-node kube clusters which may live in a node pool. It may be desirable to solve networking issues perhaps to enable seamless node connections, dns and load balancing based on geographical lookups.

Phase 4 may include enabling multi-tenant use of kube nodes. In other words, a kube node (229) can belong to multiple clusters perhaps controlled by the application developer (228).

Embodiments of the application may provide a native client application (230) which may be a multifacet application that can allow a user to not only manage RevoFi miners, but may also manage their own mobile data plans as an end user. Stakeholders (231) of the application may be provided and may include their user stories/interaction with the application.

Stakeholders may include individually or in any combination:
  Individual Everyday User (IEU) (232): These people may or may not own a miner and may mainly be interested in participating as a regular telco consumer, managing the mobile internet/data plan and perhaps even accessing everyday internet services via RevoFi network.
  Small Individual Miner (SIM) (233): These may be individuals who may have 1 or a few miners. They may be interested in granting free access to themselves, friends and family members, however may take an interest in leasing out unused bandwidth and even making money.

Small Business Operator (SBO) (234): These may manage 1 or more miners perhaps on business real estate. They may want to grant free access to their on premise device and employees, however they may predominantly be interested in leasing bandwidth/resources to the broader RevoFi network. Operating these miners may be considered a major revenue stream.

Enterprise Accounts (EA) (235): These may be businesses which may require teams to deploy and even manage all devices in their infrastructure. They may also want to grant some free access to their own assets, however they may be predominantly interested in the decentralized web service and even the telco business model. This may be a significant stream of income.

Individual Everyday Users (IEU) may be an everyday end user which may be what gives the RevoFi network all of its value. If enterprise application developers can deploy web services onto the RevoFi network, it may be because they are servicing the everyday end user. Thus, they may be first on our list for the most important stakeholder RevoFi may ever have. The everyday user can be exposed perhaps when the following happens either individually or in any combination:

They try to connect to a Wi-Fi hotspot that says revofi.com, and they may be prompted to download the app to gain access.

They may be at a business that offers revofi Wi-Fi, and they may be prompted to download the app to gain access to the network.

They may be in the home of friends or family that want to give them access to their RevoFi network.

They may move to a new city with RevoFi coverage, and may just want to buy a mobile internet data plan.

All access to the RevoFi Wi-Fi network may require installation of the RevoFi app perhaps because it may be the only way to facilitate Wi-Fi roaming and even offload experience, where users can travel the streets of whatever city they are in and have a seamless handoff of Wi-Fi connectivity.

[User Story 01—IEU] First App Download

[Phase 0: Authenticate or Not]

When a user may first download the application, they may have the option of claiming 10 GB of free data through authenticating input (236) via their phone number, email, single sign-on, SSO via Google, facebook login information, social media account login information, any combination thereof, or the like. We can use the same flow as signal or lyft or the like for authentication of the account which may award the 10 GB. It may then be disclosed to the user that the only way to recover their accounts data may be through registration.

[Phase 1: Account Setup Finished]

After phase 0, an account and user wallet (237) may be finished. The application may provide a miner option (241) or a wi-fi access option (238) and can then ask if they are setting up a miner or perhaps just accessing wi-fi. Accessing Wi-Fi may be the default option which may kick into either phase 2a or 2b below.

[Only Accessing Wi-Fi][Phase 2A: Wallet—with Authentication]

A user may be kicked into a wallet screen of the application. It can show at the top the free 10 GB perhaps with a link right below for them to add a credit card and even go into data management. Since they may have free data, they can now have internet access through the RevoFi network. Below the payment management link there may a QR code (which may be the RevoFi address) and even the current contacts they may have with a contact search. If no contacts are in the app, a button can be there instead offering to import contacts. In the contacts list, it may show people they can request data credits from as well as ask for free access to miners.

[Only Accessing Wi-Fi][Phase 2B: Wallet Screen—No Authentication]

A user may then be kicked into the main application. If they chose not to authenticate, they may not get the free 10 GB. It can show zero data credits at the top of the screen with a link right below the amount of data they have to add a credit card and perhaps go into data management. Below the payment management link there may be a QR code (which can be the RevoFi address) and even the current contacts they may have with a contact search. If no contacts are in the app, a button can be there instead offering to import contacts. In the contacts list, it may show people they can request data credits from as well as ask for free access to miners.

Data usage may not be applied if they are given free access to the device by their friend/family member's RevoFi miner. The cell may highly prefer and may automatically connect to nodes that are given free access to first.

Once the user may run out of data credits, they can get an app notification that they need to buy more data for their plan (this notification can be push notification). If they choose to buy data, we can offer a minimum amount of data purchased at ~$20/1 TB (This amount may be different). Since this purchase may be through the iOS or Android store, they may need to pay more, perhaps so that the company, such as RevoFi, may at least gets $20 after taxes. A user may be enrolled in automated purchase plans which they can manage in their settings.

A wallet screen could include how much RVS they may own perhaps next to an amount of data they have. A user can have multiple wallets under it, where some wallets could be 1:1 mapped to an actual device such as a miner or the like. One may need to go through a setup phase when adding a miner.

[User Story 02—IEU] Tries to Search/Add Contact and Interacts w/Other Users

A search contacts component in the app may let you search by either email, phone number, username, RevoFi address or you can scan the QR code on someone else's phone which automatically pops their contact info, or the like. When the contact pops up, if you have not saved them in your permanent contacts, you can choose to. Once done, you may see options for that contact.

When interacting with a contact you may do any one of the following individually or in any combination:

Request free access to one of their miners, if they have miners listed under their account.

In the screen of available miners, it could show which miner may be in range for Wi-Fi connectivity.

Request data credits or RVS from the user.

Send data credits or RVS to the user.

Request to share a joint wallet that both users can spend and earn RVS from. This may be useful for family and friend plans.

Transfer ownership of miners/wallets or assets. This may be useful for enterprise applications.

Request ownership of miners/wallets or assets. This may be useful for enterprise applications.

Set up a transfer account link, perhaps where a miner can set aside a percentage of the mined/earned rewards to the other user. This can be done on an individual basis of owned miners or on the entire wallet root as a whole. This may be useful for enterprise applications.

Request transfer account link, where the requested user could pay a percentage of the RVS mined/earned to the requesting user. The user with ownership of the wallet can disconnect the rewards. This can be done on an individual basis of owned miners or even on the entire wallet root as a whole. This can be useful for enterprise applications.

Small Individual Miners (SIM)

When an individual may buy their miner, they may be looking to use the Wi-Fi for their own system perhaps along with earning RVS, which can be eventually sold for cash or burned into data credits for use on systems that they may not own. These may be the everyday people who may end up purchasing the device at Walmart or Bestbuy or the like, and may or may not intend to turn this mining into a business.

[User Story 01—SIM] First Unboxing and Setup

[Phase 0: Account Setup First Install]

When a user may unbox their first Wi-Fi miner, they may not be sure what to expect. On the top of the box may be a QR code that they can scan or instructions they can follow to download the app from their respective store. We may support iOS and Android or others. If they choose to scan the QR code, if the process is fresh, it can send them through IEU:01—phase 0 where they end up at IEU:01—phase 1. IEU:01—phase 1 may ask if the user is installing a miner or just accessing Wi-Fi. If they did a fresh install by scanning a QR code, we may be able to skip the question go to SIM:01—Phase 1.

[Phase 1: Miner Setup]

The app may then ask to approve bluetooth and gps tracking perhaps only when using the app to connect to the device and then to make sure the device may be plugged in. Once the user may accept the terms and conditions, and even enables the application access to bluetooth and gps location, it can then begin to scan for mining devices to set up. During scanning, the app can show the user the light sequencing on the miner that shows it may be in setup mode.

Once the device may be found and even listed, the user can then confirm that its their miner perhaps by selecting the miner which shows the actual name of the miner type.

[Phase 2: Post Miner Setup]

Once the miner may be setup, it can put in a prefilled made up name for the miner label perhaps with a unique id to show the device may be owned by your wallet. It can show the status of the miner which can have any one the following statuses individually or in any combination:

Connected to the Internet (Yes or No)

Connected to the RevoFi Network (Yes or No)

Participating in the RevoFi Network (Yes or No)

Passed RevoFi Health Checks (Yes or List Error)

[User Story 02—SIM] Second Unboxing and Or Existing Customer

[Phase 0: Install on Existing Account]

When the user may have the app installed and ready on the phone, they can scan the QR code which may open the app up and kick them into the UX flow SIM:01—Phase 1. However, the user may open the app directly and even navigate to the miners page. One may also see miners owned in the wallets page since each miner may have its own wallet, but that wallet may actually be owned by the root wallet which the user owns.

In the miners page, they can see some high level status metrics on each miner as mentioned in SIM:01—Phase 2. Or perhaps a button that says add miner and kicks them into the UX flow SIM:01—Phase 1.

[User Story 03—SIM] Miner Lists and Drilldown

[Phase 0: Miner List Page]

On the miner list page, there may be a list of miners and may also include aggregate metrics of all the miners. These aggregate metrics may include the following individually or in any combination:

Current unique aggregate device sessions connected to all miners.

Number of unique device sessions over 1 hour-24 hour period, 1 day over 1 week, 1 day over month, 1 week over year, or the like.

Total data credits burned over 1 hour-24 hour period, 1 day over 1 week, 1 day over month, 1 week over year, or the like.

Total RVS earned over 1 hour-24 hour period, 1 day over 1 week, 1 day over month, 1 week over year, or the like.

There may be a map in the miners list page that can show the current location of all the devices the person owns along with devices that may not be owned and may just be existing in the network.

On the miner list page, it may show all of the miners currently owned by the user perhaps as well as the statuses described in SIM:01—Phase 2. Other things that could be visible in the list include notifications perhaps on specific miners via badges such as when another user may be making a special request towards the miners as outlined in IEU:02. When the user clicks on the particular miner, they may see the following details.

[Phase 1: Miner Detail Page]

A detailed page can show the detailed metrics that may not be aggregated about the device which may include the following individually or in any combination:

Current unique device sessions connected to all miners.

Number of unique device sessions over 1 hour-24 hour period, 1 day over 1 week, 1 day over month, 1 week over year, or the like.

Total data credits burned over 1 hour-24 hour period, 1 day over 1 week, 1 day over month, 1 week over year, or the like.

Total RVS earned over 1 hour-24 hour period, 1 day over 1 week, 1 day over month, 1 week over year, or the like.

It can also have a list of notifications that the individual can respond to, such as granting free access to certain users. A possible idea may include generating a WPA3 username and password that only a single device can use which could be useful for supporting electronics that may not have the ability to download and use the Wi-Fi RevoFi app. Yet, this may be difficult and may not encourage people to use this method of authentication.

In the detailed page for the miner, one may perform certain actions such as transferring miner ownership to another user, or setting up a link to let x % of the miner's earnings go to a different wallet, or the like.

Small Business Operators & Enterprise Accounts (SBO/EA)

SBO/EA may have similar systems and methods as the Small Individual Miner's User Stories. There may be more features to add such as a web dashboard for tech support, admin to monitor/manage the devices, or the like. It may be desirable to provide permissioned actions on wallets and miners for accounts that may not actually own the assets.

The RVS Exchange Embodiments of the application may provide miners or anyone who owns RVS the ability to exchange their RVS for some crypto or stable coin of their choosing which may be connected to a ramp (e.g., coinbase, binance, or the like) that may be supported where they can then take the crypto and perhaps immediately sell to withdraw cash.

Several ramps such as coinbase and binance may be integrated where the users can sync their accounts with RVS through the app perhaps to enable the withdrawal of cash. Another possibility may be that users can sync with DEX wallets which may be simpler since there may not be particular central ramps.

Figure 2:
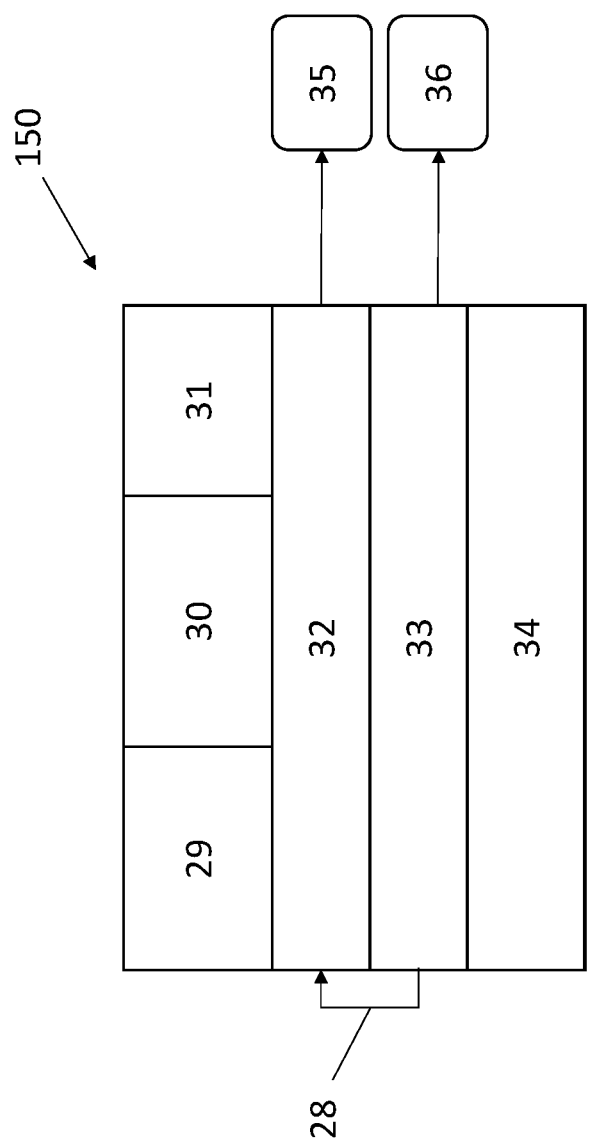
FIG. 2 shows a non-limiting example of a software stack in accordance with some embodiments of the application.

As may be understood from FIG. 2 a software stack (150) may include, but is not limited to a Container App A (29), a Container App B (30), a Container App C (31), a Container Orchestra (32), a SaltStack Minion Agent Provisioner (33), a Bare Metal Host Software Systems (34), and the like. A software stack may be a collection of independent components that can work together to support an execution of a software or application or the like. A SaltStack Minion Agent Provisioner (33) may install and even configure an orchestration layer (28) such as Container Orchestra (32). A Kubernetes Master CP (35) and even a Salts Master Cluster Provisioners (36) may result from a system.

Figure 3:
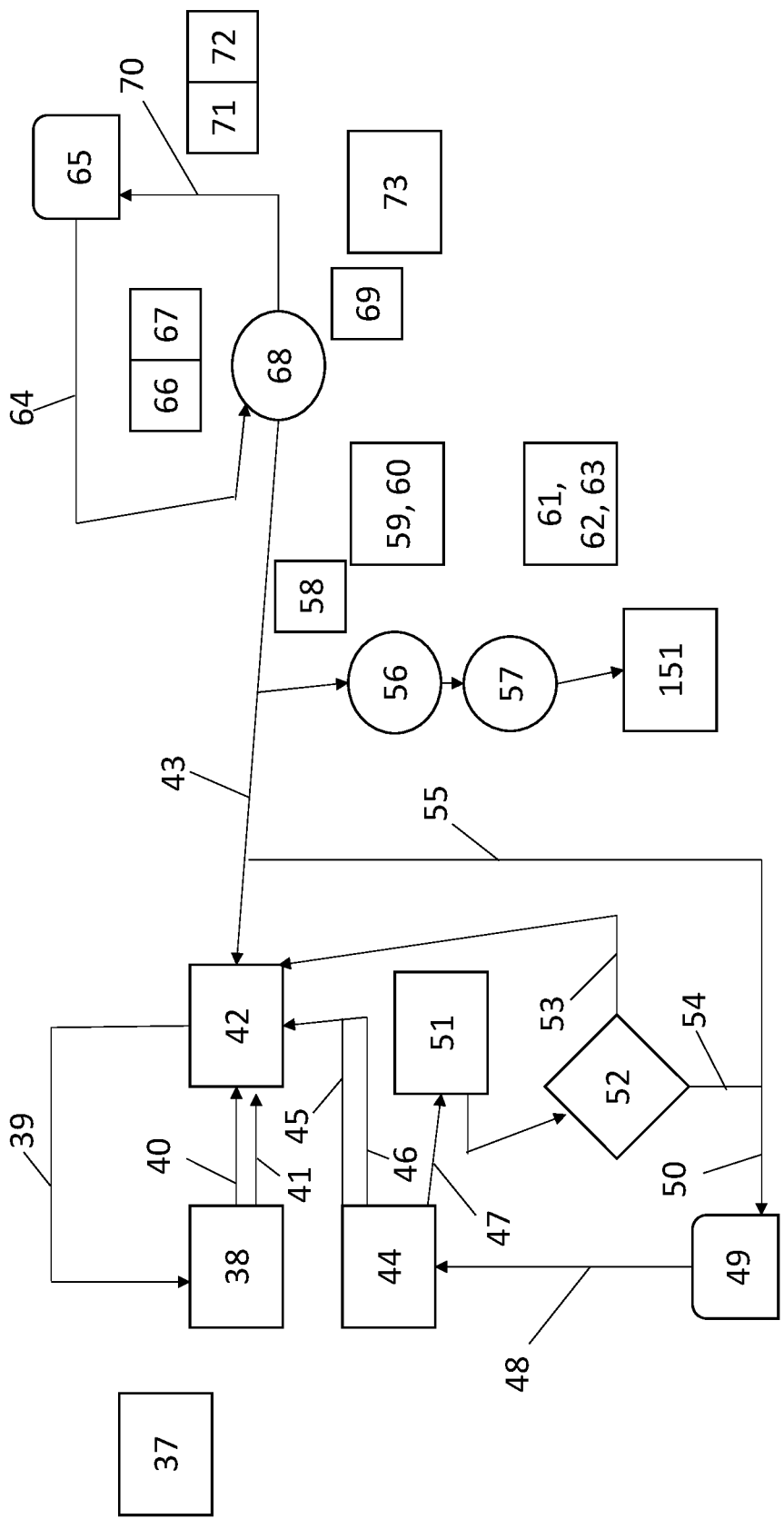
FIG. 3 shows a non-limiting example of a miner admin setup overview in accordance with some embodiments of the application.

As may be understood from FIG. 3, embodiments may provide a miner admin setup. If an application ("app") may not be downloaded to may be in a setup mode, various steps may be taken to set up a miner. On first setup/connect, a user may be asked to enter setup key. Once setup key may be entered, a user may go through EAP-TLS client/server workflow and a miner may be added to an app for management (37). A computer admin setup (38) may be provided where a computer may be connected (40) to bluetooth such as Bluetooth RevoFi-${123}-SSID (42), and then can download the appropriate app (39) and the admin setup/mode (41) may be provided on the computer. A mobile phone admin setup (44) may be connected (46) to bluetooth such as Bluetooth RevoFi-${123}—SSID (42), and may provide an admin setup/mode (45). A mobile phone (44) may scan (47) a QR Code on Miner Box (51) to perhaps connect to an app install option. If the app is installed (52) and "yes" (53), then the admin/set up mode may connect the mobile phone to a Bluetooth (42). If the app is not installed. "no" (54), then the device may be redirected to download an app (50) from an app store (49) where a user can install the app and perhaps go into Miner Setup Mode (48).

Instructions (73) for a new miner set up may include for a web app: (1) plug a miner into ethernet; (2) navigate to wi-fi connection revofi-${123}; (3) download the app for their OS (e.g., Linux, OsX, PC, or the like); and perhaps even (4) run app and enter setup key. For a mobile app instructions may include: (1) scan QR Code on top of box for setup; and perhaps even (2) download RevoFi App. A miner may start for a first time (68) by turning on the device and app (69) which may allow and even turn on bluetooth setup mode (43) to a Bluetooth (42) connection. A miner may complete a computer or mobile admin setup (58) which may allow access to a EAP-TLS client/server workflow (56) and then a Miner Setup Done/Admin Dash (57) may be complete and wi-fi may be enabled (151). Once an EAP-TLS may be complete then a miner can be added to app (59). A wallet generated or even downloaded on a device can be synced with the miner (60). An admin dashboard can be authenticated via wallet on both miner/managing device (61). For a computer admin, it can be served using web app Miner (62). For a mobile device, an app may be completely native and may authenticates/commands miner via API microservice running on micro miner (63).

Once a minder may start up for a first time (68), a mutual authorization and registration (70) may occur with a salt stack fleet management (65). A key pair generation may be provided with a public (71) or even a private (72) key. Updates (64) may be provided by the salt stack fleet management (65) to the miner. A key pair fleet management may be provided with a public (66) or even a private (67) key. A miner may be directed (55) to an app store (49) to download an app.

Figure 4:
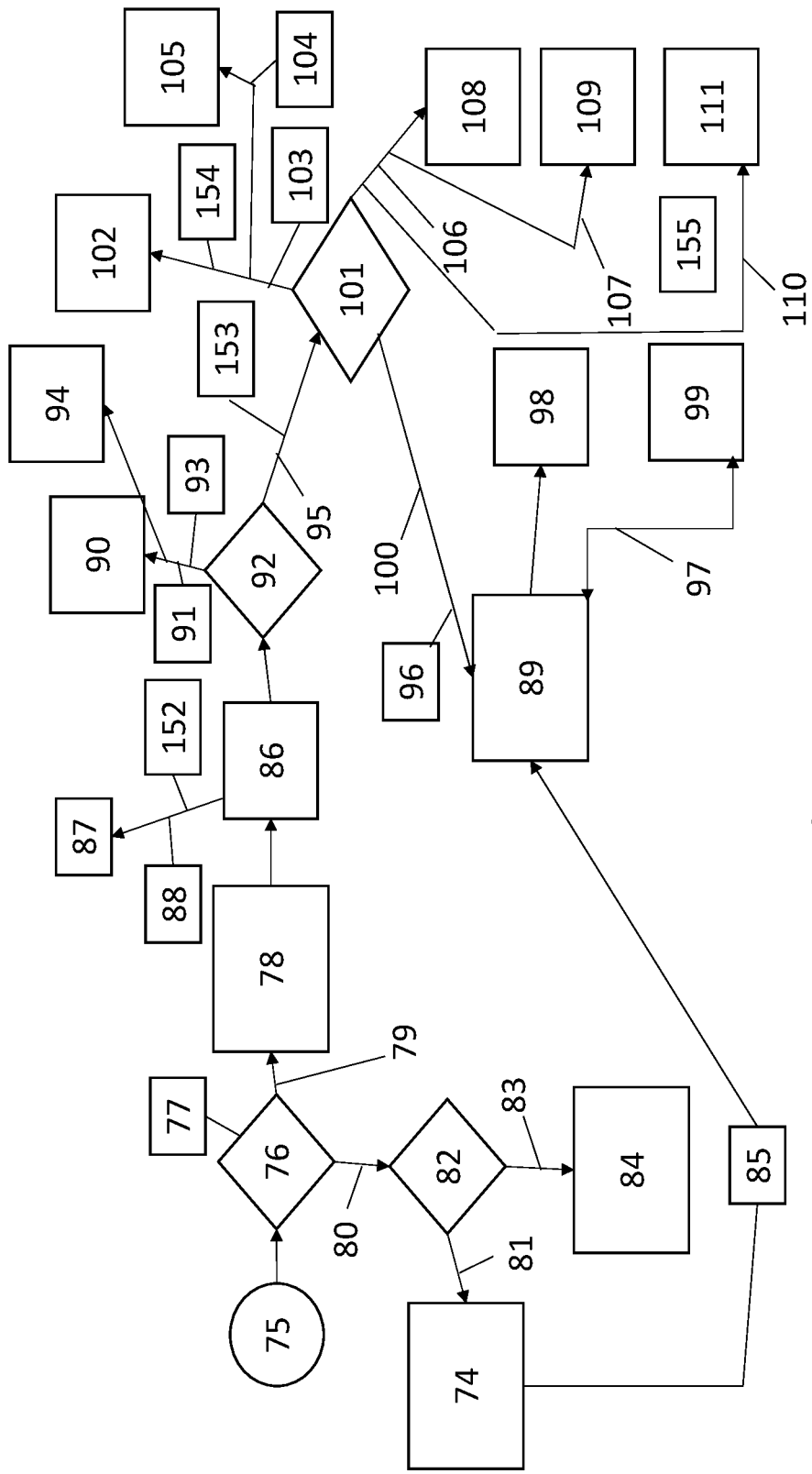
FIG. 4 shows a non-limiting example of an EAP-TLS client-server workflow in accordance with some embodiments of the application.

FIG. 4 shows a non-limiting example of an extensible authentication protocol/transport layer security ("EAP-TLS") client-server workflow. In a blockchain, it may be that only the public key of a wallet is ever stored, in some embodiments. A process may be susceptible to attack on a cloud infrastructure; however perhaps using a shared responsibility model may overcome attacks. A password and client side encrypted key may be used. Normal and even enterprise users may prefer a method where keys can be recoverable. A client app (75) may be provided. Here a system may identify unique devices and can white list or even black list devices. A system may ask if the client app is a new account?(76). As part of a new account there may be an account linking (77) perhaps via email, username, phone number, or the like. If it is a new account, "yes" (79) a system may generate a wallet key and link if a user may want to use data on other devices (78). Next a system may generate a public and private key (86) for the wallet. A wallet may be stored (152) on a device (87). A public key certification private key wallet (88) may be created and even stored. If the client app is not a new account, providing a "no" (80) to the question, then a system may determine if it is a cloud managed key (82). If "no" (83), a system may provide a process to authenticate user to device with a stored encrypted wallet key and send wallet key to requesting device (84). A private wallet key with a public wallet certificate (85) may be provided. This type of process may not be susceptible to attack on a cloud infrastructure; however recovery to key's may not be possible if all devices with private key may be unavailable. If the answer to the question of a cloud managed key (82), is "yes" (81), then a process to authenticate a user to send a client side encrypted wallet key (74) may be directed. Once a private wallet key has been implemented, a user now has a wallet (89) which may now allow access to a wi-fi app (98) which may be part of a blockchain AAA (99). An EAP-TLS AAA Radius (97) may exist between a blockchain AAA (99) and a wallet (89). An AP such as an RevoFi AP may run a RADIUM server which may use a local daemon process that can communicate to the blockchain which may act as a AAA server. A daemon process can send out ACK to the users device to sign datacredit burn approvals which its wallet to authorize transfer of data in a Wi-fi App.

After a system may generate a public and private key (86) for a wallet, it may ask if a cloud stored wallet is enabled (92)? If no (93), a key management service ("KMS") (90) may be provided which may be connected to a blockchain (94). A public key certificate stored with a linked account (91) may be provided. If a cloud stored walled is enabled and the answer is "yes" (95) a system may encrypt a private wallet key (153) which may be asked a next question, "is recovery enabled?" (101). If yes (103), a KMS (102) may be provided which may be connected to a blockchain (154). A recovery secret (104) may be provided and may be a recovery secret stored plain text (105). Users can reset passwords to get recovery key through a phone or even normal recovery flows. This may be susceptible to cloud infrastructure attack, but can be an appropriate mode for most clients. A public key of a wallet may be stored on a blockchain.

If the answer to the question, "is recovery enabled?" (101) is no (106) then a user may be connected to a blockchain (108) and may be encrypted a private key with a recovery secret (107) which may be connected to a KMS and blockchain (109). A private wallet key with a public wallet certification (155) may be included. An encrypted recovery secret (110) may provide a recovery secret stored as encrypted blob, encrypted with client generated password (111). Users may not be able to reset their password should they forget. This may not be susceptible to a cloud infrastructure attack perhaps since all data may be client side encrypted. This may be what an enterprise may want. A public key of wallet may be stored on a blockchain.

After an answer (100) to the recovery enabled (101) question, a private wallet key with a public wallet certificate (96) may be provided which may allow access to a user to a wallet (89).

Figure 5:
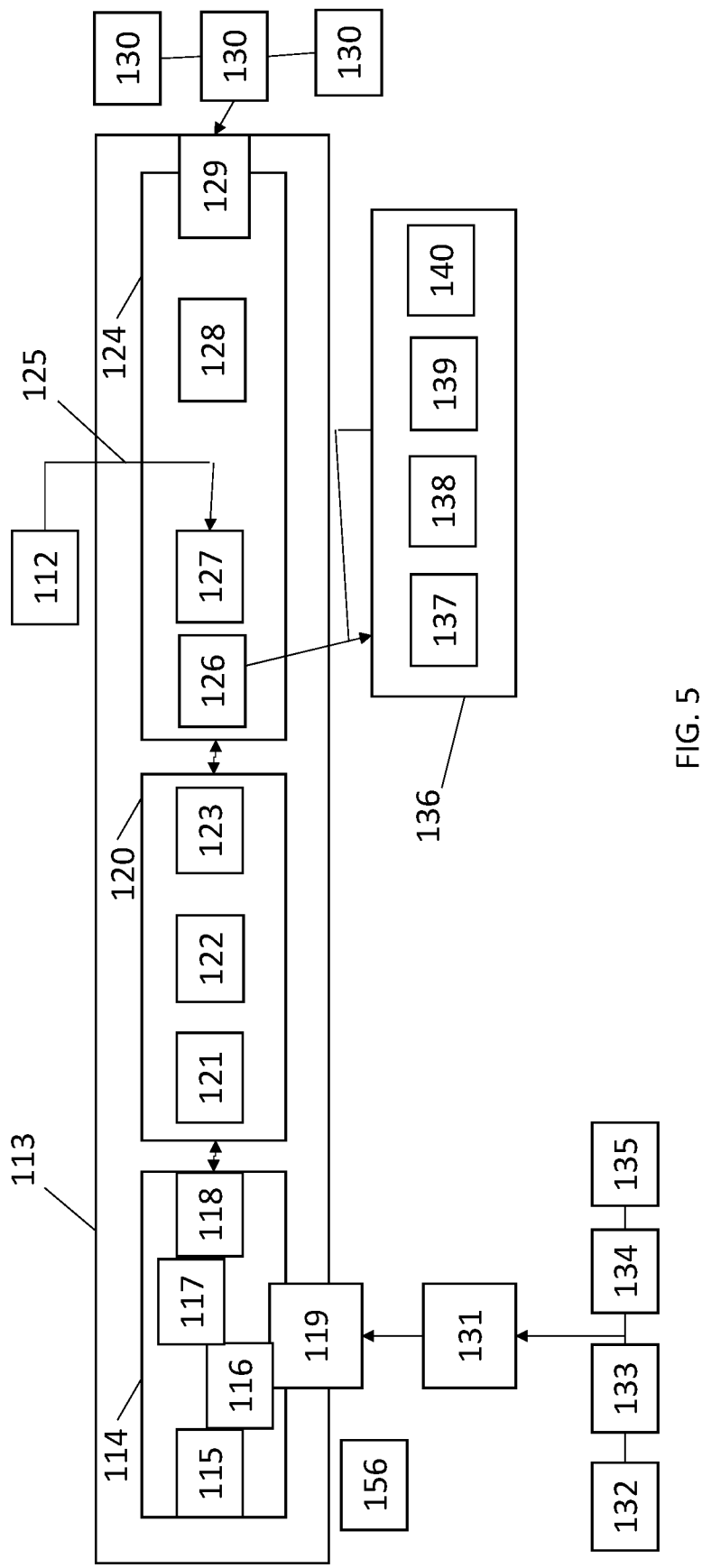
FIG. 5 shows a non-limiting example of a fleet management overview in accordance with some embodiments of the application.

FIG. 5 shows a non-limiting example of a fleet management overview. Web services (113) such as amazon web services may be provided along with a VPC—Salt Master Cluster (114), a VPC Database/PKI (120), and perhaps even a VPC-Factory (124), a VPC—Salt Master Cluster (114) may include a salt master 0 (115), a salt master 1 (116), a salt master 2 (117) and a plurality more of salt masters as needed such as up to salt master N (118). These may be connected to a DNS with an elastic IP (119) and may include a load balancer TCP—session aware (156). Minions may be behind many types of networks (131) that a system may not control such as home private networks and the like. For example, any number of minions may be utilized such as but not limited to minion 0 (132), minion 1 (133), minion 2 (134), and up to minion M (135). A VPC Database/PKI (120) may include accepted minion public keys (121), minion states (122), minion metrics and even statuses (123), and the like. A VPC-Factory (124) may include factory microservice add and remove minion authorization public and private keys (126), state microservice update states for env-platform-targets (127), and even microservice which can report the states of minions and connections perhaps as well as disconnected minions (128). A gitlab ci managed states (112) may be connected (125) to state microservice update states for env-platform-targets (127). Factory microservice add and remove minion authorization public and private keys (126) may be connected to a factory (136). Private and public pairs can be generated in a factory. A factory can install master salt pubs on minions for verification with a DNS host. It can also install pub of minion in authenticated db for masters to verify and even accept connections. A factory (136) may include a plurality of minions such as but not limited to minion 0 (137), minion 1 (138), minion 2 (139), and up to minion M (140). The web services (113) may be connected to a VPN (129) which may be connected to a plurality of corporate laptops (130) which may be able to see metrics and other things in the microservices and the like.

As can be easily understood from the foregoing, the basic concepts of the various embodiments of the present invention(s) may be embodied in a variety of ways. It involves decentralized wireless cloud services networks techniques as well as devices to accomplish the appropriate decentralized wireless cloud services networks. In this application, the decentralized wireless cloud services networks techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the various embodiments of the invention(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified). In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application.

It should also be understood that a variety of changes may be made without departing from the essence of the various embodiments of the invention(s). Such changes are also implicitly included in the description. They still fall within the scope of the various embodiments of the invention(s). A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the invention(s) both independently and as an overall system.

Further, each of the various elements of the embodiments of the invention(s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the invention(s), the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the invention(s) is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of "decentralize" should be understood to encompass disclosure of the act of "decentralizing"—whether explicitly discussed or not—and, conversely, were there effectively disclosure of the act of "decentralizing", such a disclosure should be understood to encompass disclosure of "decentralize" and even a "means for decentralizing." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any information statement filed with the application are hereby appended and hereby incorporated by reference, however, as to each of the above, to the extent that such information or statements incorporated by reference might be considered inconsistent with the patenting of the various embodiments of invention(s) such statements are expressly not to be considered as made by the applicant(s).

Thus, the applicant(s) should be understood to have support to claim and make claims to embodiments including at least: i) each of the decentralized wireless cloud services network devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

In addition and as to computer aspects and each aspect amenable to programming or other electronic automation, it should be understood that in characterizing these and all other aspects of the various embodiments of the invention(s)—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent inventions, and xxxiii) the various combinations of each of the above and of any aspect, all without limiting other aspects in addition.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 9 or any other claim" or the like, it could be re-drafted as dependent on claim 1, claim 8, or even claim 11 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for providing decentralized wireless cloud services comprising the steps of:
   providing a distributed ledger database;
   providing a consensus algorithm;
   providing an exchange wallet;
   providing a platform;
   providing a distributed cloud;
   integrating said exchange wallet, said platform, and said distributed cloud into said distributed ledger database to create a decentralized wireless cloud system;
   adding resource nodes to said decentralized wireless cloud system;
   providing a resource from said resource nodes on said decentralized wireless cloud system;
   wherein said resource comprises a network resource from at least some of said resource nodes; and
   rewarding owners of said resource nodes for said resource provided by said resource nodes on said decentralized wireless cloud system with tokens.

2. The method as described in claim 1 wherein said distributed ledger database comprises a blockchain.

3. The method as described in claim 1 wherein said resource is chosen from wireless storage, wireless coverage, wireless computing, verifying a network, and any combination thereof.

4. The method as described in claim 1 wherein said network resource comprises a mobile network hotspot.

5. The method as described in claim 1 and further comprising the step of validating said resource in said decentralized wireless cloud system.

6. The method as described in claim 5 wherein said step of validating said resource in said decentralized wireless cloud system comprises the steps of:
issuing a challenge to said resource node from a challenge node which was randomly selected from a swarm of nodes; and
providing proof of said resource from said resource node of said owner to said challenge node.

7. The method as described in claim 5 wherein said step of validating said resource in said decentralized wireless cloud system comprises the steps of:
issuing a proof of ping challenge from a challenging node to said resource node of said owner; and
witnessing said proof of ping challenge by a randomly selected swarm of nodes.

8. The method as described in claim 7 and further comprising the step of responding with a response ping to said challenging node from said resource node; and witnessing said response ping by said randomly selected swarm of nodes.

9. The method as described in claim 1 and further comprising the step of periodically challenging at least one of said additional resource nodes with a mutual authentication challenge by spending data credits and sending anonymous data to said at least one additional resource node.

10. The method as described in claim 1 and further comprising the step of providing a plurality of owners each providing different commodity chosen from: a proof of ping challenger; a proof of ping challengee; a security token owner; a proof of network wi-fi utilization provider; a proof of network computer utilization provider; and a proof of network storage utilization provider.

11. The method as described in claim 10 and further comprising the step of creating a block on a blockchain utilizing said commodities.

12. The method as described in claim 1 and further comprising the step of providing a device capable of connecting to said decentralized wireless cloud system.

13. The method as described in claim 12 and further comprising the step of adding a user via said device to said decentralized wireless cloud system.

14. The method as described in claim 13 and further comprising the step of downloading an application on said device to access said decentralized wireless cloud system.

15. A decentralized wireless cloud service system comprising:
a distributed ledger database;
a consensus algorithm;
an exchange wallet;
a platform;
a distributed cloud;
software configured to integrate said exchange wallet, said platform, and said distributed cloud into said distributed ledger database to create a decentralized wireless cloud system; resource nodes in said decentralized wireless cloud system configured to provide a resource on said decentralized wireless cloud system;
wherein said resource comprises a network resource from at least some of said resource nodes; and
a reward system to owners of said resource nodes for said resource.

16. The system as described in claim 15 and further comprising an individual everyday user in said decentralized wireless cloud system.

17. The system as described in claim 15 and further comprising a small individual miner in said decentralized wireless cloud system.

18. The system as described in claim 15 a small business operator in said decentralized wireless cloud system capable of providing said network resources to said decentralized wireless cloud system.

19. The system as described in claim 15 an enterprise account in said decentralized wireless cloud system capable of providing said network resources and devices capable of connecting to said decentralized wireless cloud system.

20. The system as described in claim 15 and further comprising an application on a device that connects a user to said decentralized wireless cloud system.

21. The system as described in claim 20 wherein said application comprises a wi-fi access option through said network resources.

22. The system as described in claim 21 and further comprising a connection between said user and another user of said decentralized wireless cloud system.

23. The system as described in claim 22 and further comprising options between said user to interact with said another user or miner, said option is chosen from:
request free access to a miner of said another user;
showing available miners in range for wi-fi connectivity from said another user;
requesting data credits or tokens from said another user;
requesting to share a joint wallet with said another user;
transfer ownership of assets between said user and said another user;
request ownership of assets from said another user;
set up a transfer account link with said another user;
request a transfer account link from said another user; and
any combination thereof.

* * * * *